United States Patent [19]

Brandt

[11] 4,355,763
[45] Oct. 26, 1982

[54] PESTICIDE SPRAY SYSTEM

[76] Inventor: Michael W. Brandt, 1111 W. Mockingbird La., Dallas, Tex. 75247

[21] Appl. No.: 9,123

[22] Filed: Feb. 5, 1979

Related U.S. Application Data

[60] Division of Ser. No. 623,648, Oct. 20, 1975, abandoned, which is a continuation-in-part of Ser. No. 462,364, Apr. 19, 1974, Ser. No. 532,446, Dec. 13, 1974, Pat. No. 3,970,121, and Ser. No. 573,490, May 1, 1975.

[51] Int. Cl.³ .................................................. A62C 13/52
[52] U.S. Cl. .................................................... 239/302
[58] Field of Search ............... 239/302, 303, 304, 308, 239/309; 141/7, 2, 3, 4, 5, 18, 329, 330, 323, 59; 137/205, 571, 572, 575

[56] References Cited

U.S. PATENT DOCUMENTS

| | | | |
|---|---|---|---|
| 3,640,319 | 2/1972 | Hougen | 141/59 |
| 3,726,303 | 4/1973 | Allen et al. | 137/205 |
| 3,913,606 | 10/1975 | Anderson, Jr. | 137/205 |

*Primary Examiner*—James B. Marbert

[57] ABSTRACT

A method of metering and spraying toxic pesticide comprising a vacuum line having a first end attached to a vacuum source, such as an intake manifold on an internal combustion engine, and having a second end communicating with the inside of a metering chamber. A float valve in the metering chamber on the second end of the vacuum line to close the vacuum line or in a vent passage to the metering chamber is adjustable in the metering chamber to control the level to which liquid is drawn into the metering chamber. A pesticide transfer line is connected from the metering chamber to a source of liquid pesticide positioned at a level below the metering chamber such that a vacuum in the metering chamber will draw pesticide from the pesticide source through the pesticide transfer line into the metering chamber. When the surface of the liquid reaches the float valve flow of liquid through the liquid transfer line to the metering chamber is terminated. After the liquid has been deposited in a spray tank with a predetermined amount of water to dilute the liquid pesticide, a pump is used to spray the liquid through a spray nozzle.

9 Claims, 7 Drawing Figures

PESTICIDE SPRAY SYSTEM

CROSS-REFERENCE TO RELATED APPLICATIONS

This is a division of application Ser. No. 623,648, filed Oct. 20, 1975, now abandoned which is a continuation-in-part of my copending application, Ser. No. 462,364 filed Apr. 19, 1974, entitled "Chemical Injector"; copending application Ser. No. 532,446, now U.S. Pat. No. 3,970,121 filed Dec. 13, 1974, entitled "Liquid Injector"; and my copending application Ser. No. 573,490 filed May 1, 1975, entitled "Liquid Handling Apparatus".

BACKGROUND

Hazards are encountered in handling and measuring chemical pesticides or fertilizers due to the posionous nature of these chemicals.

Chemical pesticides and fertilizers are generally packaged by manufacturers in concentrated form in a suitable storage container or vessel constructed of various materials such as tin, glass, plastic, and the like. Heretofore, toxic liquid pesticides have been poured from the storage container into a measuring vessel, such as a teaspoon or a measuring cup, and then poured from the measuring vessel into a suitable spraying apparatus.

Dangers arise from improper handling of such chemicals both to the user from improper body contact with the chemical and to plants from the improper dosage of the chemical.

In pouring liquid pesticide from a storage container into a measuring vessel and subsequently into a sprayer, the toxic pesticide is often spilled or mismeasured resulting in unnecessary contamination of the environment and exposing the user to extreme and often unappreciated hazards by contaminating his skin with the pesticides or chemicals.

Persons who handle the chemicals everyday in their work are unnecessarily exposed to the chemical in two manners. First, skin contact is possible resulting from spillage almost everytime the sprayer must be refilled. Second, breathing the concentrated vapors of toxic pesticide released in measuring the chemicals in open vessels is difficult to avoid. The inhaling of toxic materials everyday by a human could eventually cause serious poisoning resulting in lung and heart disorders.

Upon skin contact with some chemicals, they are absorbed into the body through the skin. Many chemical pesticides have residual effects which may cause harm to the human body.

SUMMARY

I have devised a method and apparatus for removing a measured quantity of toxic liquid from a storage container and depositing the measured quantity of toxic liquid into a sprayer while maintaining the toxic liquid in a sealed system at all times while it is being transferred from the storage container into the sprayer.

The system comprises a closure on the storage container; a transfer line connecting the storage container closure to a metering chamber, and a vacuum line having a first end adjustably connected to the metering chamber. The second end of the vacuum line is connected to a vacuum source such as the intake manifold on an internal combustion engine to draw a vacuum on the vacuum line.

The storage container comprises a large can usually having a plastic or metal pouring spout or neck with a seal thereon and a cap. A coupling is screwed onto the spout of the sealed storage container and a hollow sleeve having a cutter on the end thereof is threaded through the coupling to cut an opening in the storage container. A pickup tube, secured to the transfer line is passed through the bore in the sleeve and through the opening in the spout to the bottom of the storage container. The second end of the transfer line, is connected to the metering chamber. A vacuum is drawn on the metering chamber through the adjustable vacuum line connected to a vacuum source and the liquid is drawn from the storage container, which is stored below the metering chamber to prevent siphoning liquid from the storage container, into the metering chamber.

As the liquid rises in the metering chamber, it moves a float valve to close the vacuum line to terminate flow of liquid into the metering chamber. In a modified form of the metering chamber, rising liquid in the metering chamber moves a float valve to open a vent passage to terminate flow of liquid into the metering chamber.

The spray tank is then filled with water to dilute the concentrated pesticide and a pump is used to deliver the liquid from the tank through a spray nozzle.

A primary object of the invention is to provide a method and apparatus for handling toxic liquid wherein a precisely measured quantity of liquid pesticide can be transferred from a storage container to a sprayer tank while minimizing the possibility that the toxic liquid will come into contact with the body of the person depositing the liquid in the sprayer, that vapor of the toxic liquid might be inhaled, and that the toxic liquid will be inaccurately measured.

Another object of the invention is to provide a method and apparatus of handling toxic liquid wherein a vacuum is formed to draw liquid into a metering chamber and a float valve automatically breaks the vacuum to terminate flow of liquid into the metering chamber when a predetermined volume of liquid is contained in the metering chamber.

Another object of the invention is to provide a method of transferring liquid pesticide from large storage containers into large spray tanks in such a manner that the large storage container may be resealed after pesticide has been transferred to the tank of the sprayer.

Another object of the invention is to provide a method and apparatus to modify components of existing sprayer systems employed for dispensing diluted pesticide such that the components are employed in combination with a metering chamber to meter concentrated pesticide to the sprayer system.

A further object of the invention is to provide a method and apparatus for handling toxic liquid wherein a vacuum is created to transfer the liquid to a metering device whereupon the toxic liquid may then be transferred from the metering device directly to the spray tank without the necessity of direct handling of the toxic liquid.

Other and further objects of the invention will become readily apparent upon referring to the detailed description hereinafter following and to the drawings annexed hereto.

DESCRIPTION OF THE DRAWINGS

Drawings of preferred embodiments of the invention are annexed hereto, in which.

Numeral references are employed to designate parts of the illustrated apparatus and like numerals designate like parts throughout the various figures of the drawings.

DESCRIPTION OF A PREFERRED EMBODIMENT

Figure 1:
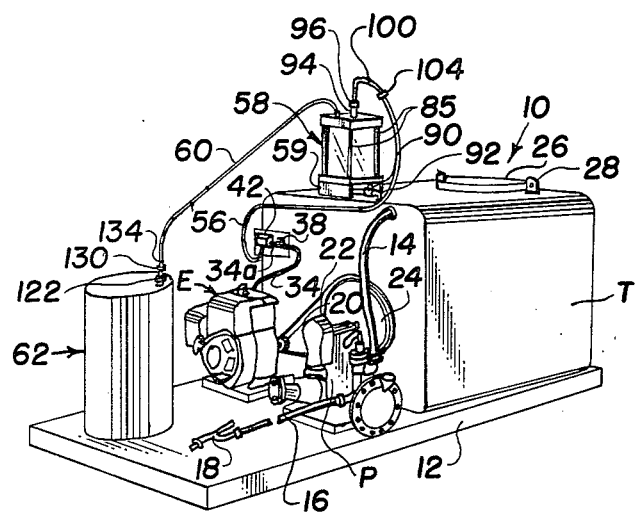
FIG. 1 is a perspective view of a spray system utilizing the vacuum transfer metering chamber and having an engine and pump thereon.

Illustrated in FIG. 1 is a typical commercial spray system 10, secured to skids 12 and comprising a tank T, a pump P, and an engine E. The spray system 10 is of a type such as the Peerless power sprayers manufactured by H. D. Hudson Manufacturing Company, Chicago, Ill. or others similar thereto.

The pump P may be a piston pump or a centrifugal pump connected to an intake hose 14 having a first end connected to the suction side of pump P and having a second end connected to tank T of spray system 10. A spray hose 16 has a first end connected to the pressure side of pump P and a second end having a spray control valve and nozzle 18 attached thereto.

A drive means for the pump P comprises an engine E such as a gasoline powered internal combustion engine of the type distributed by Briggs and Stratton of Milwaukee, Wisc. A drive pulley 20 drives a V-belt 22 which drives pulley 24 to drive the piston pump P as illustrated in the preferred embodiment.

The spray tank T has a vented water filler cap 26 pivotally secured to the top of tank T by hinge 28.

Figure 4:
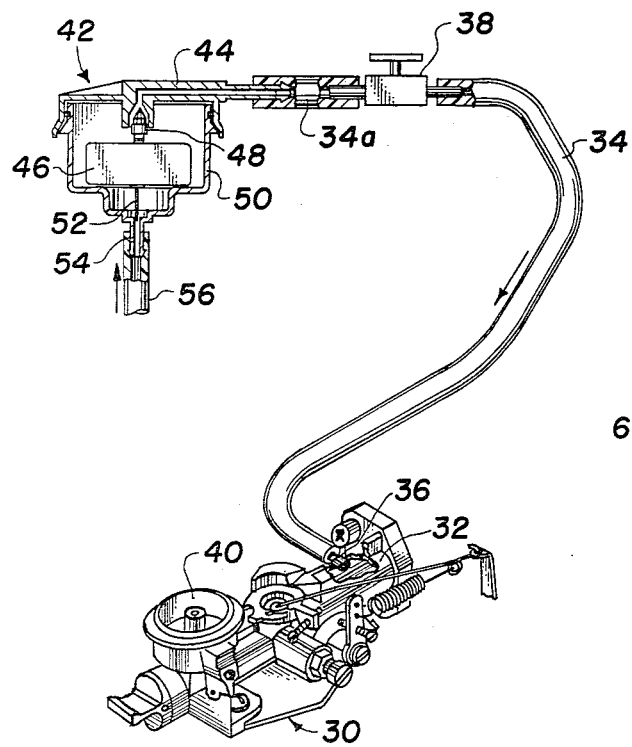
FIG. 4 is an enlarged perspective view diagrammatically illustrating the vacuum line attached to the intake manifold of the carburetor and the liquid check valve.
Figure 3:
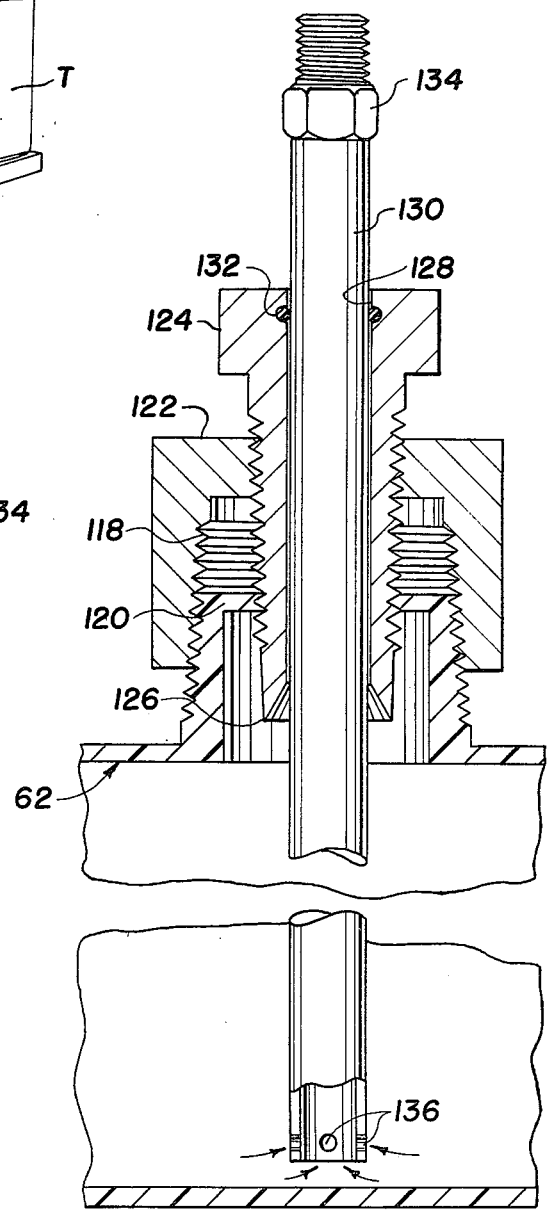
FIG. 3 is a cross-sectional view of the can cutter and transfer line.

As illustrated in FIGS. 1 and 4, a first end of vacuum line 34 is attached to the intake manifold 32 extending between carburetor 30 and the block of engine E. Coupling 36 is threadedly secured or otherwise attached to the intake manifold 32 and a second end of line 34 is connected to a valve 38. When the engine E is running, air is drawn through the intake 40 of carburetor 30 as gasoline is drawn from a fuel tank through the intake manifold 32. The engine E draws air from vacuum line 34 creating a vacuum in the line during the intake cycle of the engine.

Valve 38 is connected to a first end of line 34a which has a second end connected to a liquid check valve 42. The liquid check valve 42 comprises an outlet fitting 54; a float 46, having a shut-off valve 48 secured thereto, within the casing 50. Alignment pin 52, secured to float 46, is slideably disposed in inlet port 54. Valve 38 is preferably a two way valve having a valve element having a first position wherein lines 34 and 34a are connected and a second position wherein line 34 is closed and line 34a is vented.

As illustrated in FIG. 1, a first end of vacuum line 56 is connected to the inlet port 54 of liquid check valve 42 and the second end of the vacuum line is connected to the metering chamber 58 which is secured to the top of tank T by bracket 59.

A first end of liquid transfer line 60 is secured to the top of metering chamber 58 and has a second end secured to storage container 62 positioned below the metering chamber 58 so as not to siphon liquid out of storage container 62 and to allow drainage of liquid from transfer line 60 back into storage container 62 when line 60 is vented.

From the foregoing it should be readily apparent that when a vacuum is drawn on metering chamber 58 through vacuum lines 34 and 56, a vacuum is formed in line 60, drawing liquid pesticides or chemicals from storage container 62 into metering chamber 58 until metering chamber 58 has a predetermined amount of liquid therein as will be more fully explained hereafter. Dry powder chemicals may also be drawn into meter chamber 58 by the vacuum.

Metering chamber 58 comprises a container of suitable capacity for collection and storage of a predetermined volume of liquid chemical or pesticide. In the embodiment of the metering chamber 58 illustrated in FIG. 2 of the drawing, the chamber comprises a hollow transparent cylindrical member 64 having a longitudinally extending bore 66. The lower end of the cylinder 64 is secured in annular groove 68 formed in lower end plate 70 having a lower central passage 72 therein. A seal 74 is provided in annular groove 68 to prevent leakage.

The upper end of cylinder 64 is positioned in annular groove 76 formed in upper end plate 78 having an upper central passage 80 and an inlet passage 82 formed therein. A seal 84 is positioned in annular groove 76 between the upper end plate 78 and cylinder 64 to prevent leakage. Bolts 85 extend through axially aligned openings in the upper end plate 78 and lower end plate 70 and when tightened urge end plates 70 and 78 into sealing relationship with cylinder 64.

Lower central passage 72 is connected to conduit 86 by elbow 88. Conduit 86 is connected to drain valve 90 which is secured to the upper side of tank T by conduit 92.

Upper central passage 80 has an upwardly extending sleeve 94 threadedly secured therein. A cap 96, having a central bore 102 and a resilient seal 98 of rubber or similar material secured thereto, is threadedly secured to the opposite end of sleeve 94.

A siphonator tube 100, constructed of brass tubing or the like, is slideably disposed through and gripped by seal 98 in cap 96 and has a first end 100a secured to vacuum line 56 by connector 104 which may be a quick connect or threaded connection. The opposite end 100b of siphonator tube 100 is disposed inside of cylinder 64 and has a flared end 106. A float valve 112 is threadedly secured to end 100b of siphonator tube 100. Float valve 112 has a floating valve ball 108 having a density great enough not to be drawn into flared end 106 by the vacuum on line 56 but having a density less than that of the liquid pesticide or toxic chemicals so that it will float as liquid passes into the valve casing 110 through passages 116 causing valve ball 108 to rise against flared end 106 closing siphonator tube 100.

Because the siphonator tube 100 is slideably disposed and gripped by rubber seal 98, it may be moved up and down inside of cylinder 64. Cylinder 64 is provided with graduations for determining the volume and in the illustrated embodiment cylinder 64 is composed of a transparent material such as glass or plastic such that the end of siphonator tube 100 may be aligned with a predetermined graduation for filing the metering chamber 58 with a predetermined volume of chemical pesticide.

From the foregoing it should be readily apparent that as air is drawn from line 56 through siphonator tube 100, liquid pesticide or chemical will flow from storage container 62 through line 60 into inlet passage 86 in end plate 78 filling cylinder 64 until the level of liquid reaches valve ball 108. When ball 108 floats into engagement with flared end 106 on the vacuum or siphonator tube 100, flow of air from metering chamber 58 will terminate.

Valve 38 is closed and valve 90 is opened to drain the premeasured amount of liquid pesticide into the tank T wherein it is diluted with water or other suitable substances to form a properly proportioned sprayable substance be drawn through line 14 by pump P and sprayed through spray nozzle 18.

Storage container 62 assumes any desired configuration such as a barrel containing for example 55 gallons of pesticide. Container 62 has an externally threaded neck or spout 118 extending upwardly which is sealed across the upper end by a seal element 120. The container 62 may be constructed of steel or plastic and the neck 118 is usually constructed of plastic or light gauge metal. The sealed end 120 must be broken before liquid pesticide in container 62 may be removed. An internally threaded adaptor coupling or cap 122 is threadedly secured to neck 118. A hollow tubular cutter 124 having a sharp, tapered cutting edge 126 formed on the end thereof is threaded through cap 122 until it reaches end 120 on neck 118 where the cutting edge 126 pierces the plastic or metal cutting a hole therethrough. Cutter 124 has a central bore 128 through which pickup tube 130 is slideably disposed and gripped by seal 132 secured in the bore of cutter 124. Pickup tube 130 is connected to supply line 60 by connector 134 which is threaded or may be of the quick connect type. Pickup tube 130 has passages 136 formed therein such that as the tube is pushed against the bottom of supply container 62 liquid may be drawn therefrom.

The threads between reducer 124 and adaptor coupling 122 are loose such that air may pass therebetween to vent the supply container 62 as liquid is drawn therefrom into metering chamber 58 as air is moved out of vacuum line 56.

In the preferred embodiment supply container 62 is at a lower elevation than metering chamber 58 and below the vent passage in the top of tank T such that when the vacuum is broken by valve ball 108 or shut off valve 38 the liquid chemical will empty from transfer line 60 into supply container 62. It should be appreciated that liquid does not flow by gravity and cannot be siphoned from container 62 into tank T if valve 90 is inadvertently left open. It should also be appreciated that if valve 90 is open pressure in metering chamber 58 cannot be reduced to initiate flow through transfer line 60.

From the foregoing it should be readily apparent that a liquid chemical or pesticide may be moved from large bulk storage containers and placed into sprayers of all types utilizing a vacuum line without the necessity of ever having to come into contact with the lines.

It should be readily apparent that because valve ball 108 engages the lower end of siphonator tube 100, the liquid never touches the outside of siphonator tube 100. Thus, if tube 100 is pulled to the top of metering chamber 58 chemicals will not be on the outer surface of the tube 100 for contact with human hands and resilient seal 98 will tend to wipe the exterior of the tube for additional safety.

After valve 90 has been opened to dispense the measured quantity of pesticide from metering chamber 58 into tank T, transfer line 60 is connected to a water line (not shown) to purge chamber 58 of concentrated pesticide and to dilute pesticide in tank T.

Figure 7:
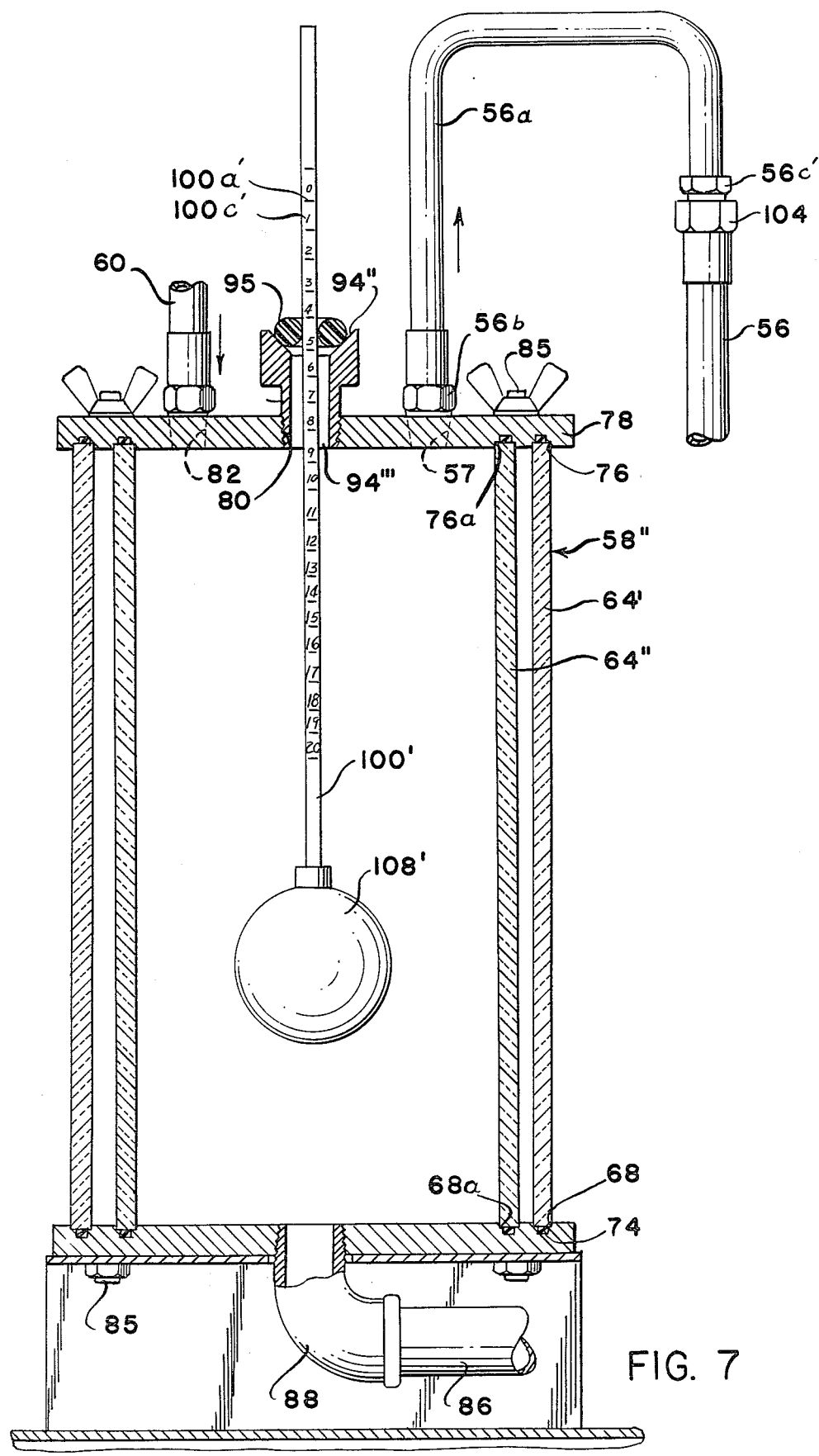
FIG. 7 is a cross-sectional view of a modified form of the metering chamber.

A modified form 58' of the metering chamber is illustrated in FIG. 7 of the drawing.

In the modified form of the metering chamber illustrated in FIG. 7, annular grooves 74 and 74a formed in end plate 70 are concentrically arranged as are annular grooves 76 and 76a formed in the upper end plate 78. A first, outer cylinder 64' is constructed of a transparent shock resistant material, for example a synthetic resin material such as Plexiglas.

A second cylinder 64" is disposed inside the outer cylinder 64' such that the outer cylinder 64' forms a protective shield about the inner cylinder 64". The inner cylinder 64" is preferably constructed of glass or other inert non-corrosive material.

Sleeve 94' is threadedly secured in central passage 80 formed in the upper end plate 78 of mixing chamber 58' and has a hollow conical shaped valve seat 94" formed in the upper end thereof. A vent passage 94''' extends through the central portion of sleeve 94' and has a valve actuating rod 100' slideably disposed therein. The upper end of valve actuating rod 100' has graduation marks 101a and indicia 101b adjacent thereto and a valve element 95 is adjustably secured to actuating rod 100'. A float ball 108' is secured to the lower end of the valve actuating rod 100'.

Vacuum line 56 is secured to tube 56a having a connector 56b on the end thereof secured through an opening 57 formed in upper end plate 76. The opposite end of vacuum tube 56a has a connector 56b secured thereto which is connectable to connector 104 on the end of vacuum line 56.

From the foregoing it should be readily apparent that when air is removed from metering chamber 58' through vacuum line 56, the pressure in metering chamber 58' is reduced to a pressure which is sufficiently less than the pressure in container 62 to initiate and sustain flow of liquid through liquid transfer line 60 from container 62 into mixing chamber 58'. However, when liquid in metering chamber 58' engages float ball 108', valve actuating rod 100' will be moved vertically through vent passage 94'''. Upward movement of actuating rod 100' results in movement of valve element 95 upwardly from valve seat 94" thereby venting the inside of metering chamber 58' to atmosphere. When valve element 95 is moved away from valve seat 94" air flows downwardly through vent passage 94''' to vacuum line 56 such that pressure in metering chamber 58' and in liquid transfer line 60 is at substantially atmospheric pressure. When the valve 95 is disengaged from valve seat 94", or when the inside of metering chamber 58' is otherwise vented, pressure in metering chamber 58' cannot be reduced to a pressure which is sufficiently less than pressure in container 62 to initiate flow of liquid to the metering chamber 58'.

Figure 2:
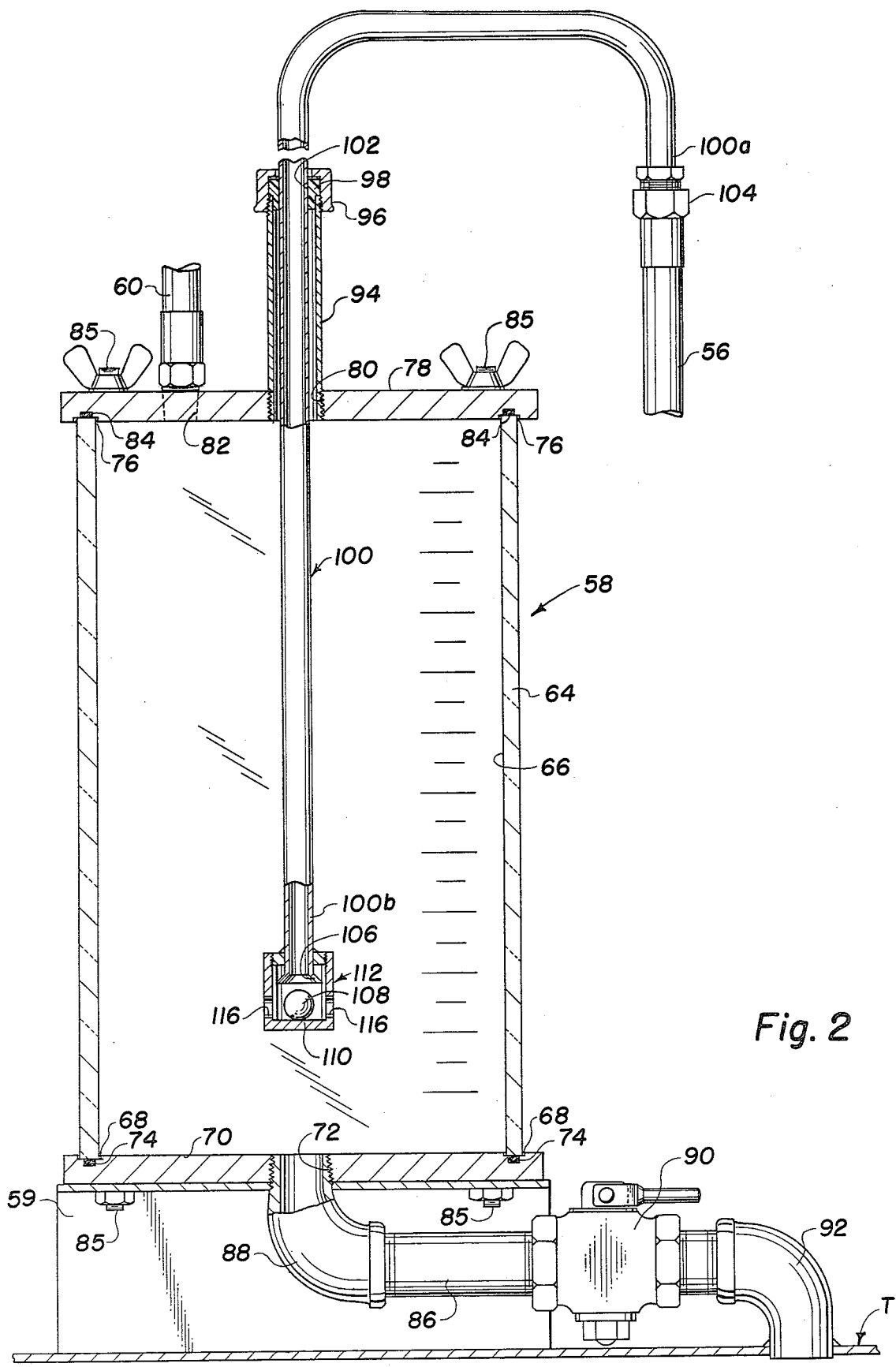
FIG. 2 is a cross-sectional view of the metering chamber.

Referring to FIGS. 2 and 7 it should be appreciated that in either embodiment of the mixing chamber liquid cannot be siphoned from a container 62 of pesticide which is positioned below the elevation of the metering chamber. It should further be appreciated that since valve 90 must be closed before pressure in metering chamber 58 or 58′ can be reduced to draw liquid through liquid transfer line 60, since tank T is vented to atmosphere, an operator cannot cause liquid to be transferred to metering chamber 58 unless valve 90 has been closed. Thus, when air is moved through vacuum line 56 no transfer of liquid occurs until valve 90 has been closed and fluid tight connections have made in the liquid transfer line between metering chamber 58′ and the source 62 of liquid.

It should be readily apparent that siphonator tube 100 is adjustable vertically to control the volume of liquid to be drawn into metering chamber 58 (FIG. 2) before float ball 108 is elevated to close the end of siphonator tube 100 to seal vacuum line 56.

It should also be apparent that valve element 95 (FIG. 7) is adjustable vertically along valve actuating rod 100′ to control the volume of liquid to be drawn into metering chamber 58′ before float ball 108′ is elevated to move valve element 95 away from valve seat 94″ to open vent passage 94‴.

FIRST MODIFIED FORM

Figure 5:
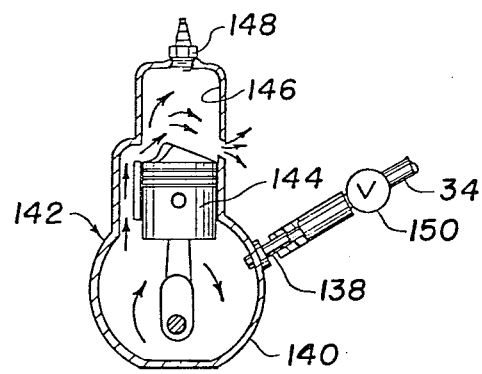
FIG. 5 is a diagrammatic view of the second embodiment, the vacuum line being connected to the crank case of an internal combustion engine.

A modified form of the apparatus of the vacuum hookup is illustrated in FIG. 5 wherein a coupling 138 is secured in fluid communication with the crank case 140 of internal combustion engine 142. As the piston 144 moves upwardly in cylinder 146, compressing the gases toward the ignition means 148, pressure is reduced in the crank case 140 pulling a vacuum on line 34 through check valve 150. Check valve 150 is closed as piston 144 moves toward crank case 140 increasing the pressure within the crank case.

SECOND MODIFIED FORM

Figure 6:
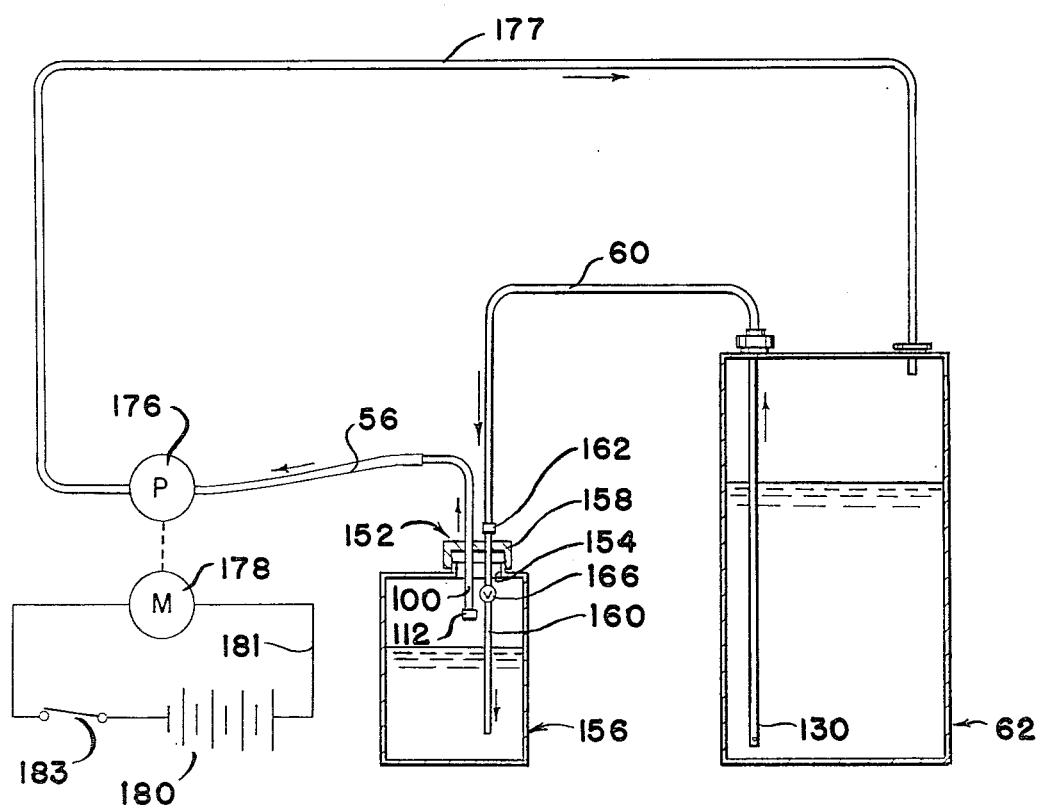
FIG. 6 is a diagrammatic view of a third embodiment of apparatus to transfer liquid from a storage container to a smaller container.

A modified form of apparatus for metering liquid pesticide from a storage container 62 is illustrated in FIG. 6, in which the metering device 152 is secured to the neck 154 of a smaller can 156.

The metering device 152 comprises a cap 158 threadedly secured to neck 154, the cap having a passage 155 formed therethrough. Supply conduit 160 extends through passage 155 and is secured to transfer line 60 by connector 162. Supply conduit 160 has a check valve 166 permitting flow of liquid into can 156 but preventing flow from can 156 back into container 62.

Siphonator tube 100 having a float valve 112 on the end thereof is connected to a vacuum line 56. Vacuum line 56 is connected to the suction side of a pump 176 driven by an electric motor 178. Electric motor 178 is powered by a battery 180 having one terminal connected by line 181 to one side and the other terminal connected through switch 183 to the other side of the motor winding.

The discharge side of pump 176 is connected to vapor return line 177 to return toxic vapor to container 62. Container 62 is vented to atmosphere.

From the foregoing it should be readily apparent that the apparatus hereinbefore described accomplishes the objects of the invention.

Spillage is minimized since a vacuum is employed to draw only a predetermined volume of pesticide and then automatically turns off. The vacuum system is arranged such that the metering chamber must be properly prepared or a vacuum cannot be created to initiate flow of liquid from container 62.

Vapor of concentrated pesticide removed from metering chamber 58 or 58′ is returned to container 62 or delivered into the piston chamber of an internal combustion engine where it is burned.

Having described my invention, I claim:

1. Apparatus to transfer a measured quantity of pesticide from a container into a tank having a pump and spray nozzle associated therewith for spraying liquid pesticide comprising: a metering chamber; means supporting the metering chamber at an elevation above the elevation of the container and above the elevation of the tank; a liquid transfer line; means connecting the liquid transfer line to the container such that a first end of the transfer line extends below the surface of pesticide in the container; means connecting a second end of the liquid transfer line in communication with the inside of the metering chamber; a vacuum line; a syphonator tube; means securing said vacuum line to said tube; a float valve; means securing said float valve to said syphonator tube; means movably securing said syphonator tube to said metering chamber such that the position of said float valve is adjustable vertically to control the level of the surface of liquid in the metering chamber; means to remove fluid from said vacuum line to reduce pressure in the metering chamber such that pressure in the metering chamber is sufficiently less than pressure in the container to sustain flow of liquid from said container through said liquid transfer line to said metering chamber; and valve means between said metering chamber and said tank, said valve means being movable between a first position wherein fluid communication between said metering chamber and said tank is blocked and a second position wherein said metering chamber is in fluid communication with said tank.

2. The combination of claim 1 wherein the means to remove fluid from the vacuum line comprises: an internal combustion engine; a fuel intake manifold on said engine; and means securing said vacuum line to said intake manifold.

3. The combination of claim 1 wherein the container has a threaded hollow neck, the end of the neck being closed by a closure element, and wherein said means connecting the liquid transfer line to the container comprises: a threaded cap connectable to the threaded neck on the container, said cap having an aperture formed therein; a hollow cutter member positionable through said aperture in the cap and adapted to form an opening in the closure element; a pickup tube movable through said hollow cutter member; and means securing said liquid transfer tube to said pickup tube.

4. The combination of claim 1 wherein said metering chamber comprises: a hollow cylinder having upper and lower ends; first and second end plates, said first end plate having a passage extending therethrough; means sealingly securing said first end plate to the upper end of said cylinder; means sealingly securing the second end plate to the second end of said cylinder; and wherein said means movably securing said syphonator tube to the metering chamber comprises, means slidably securing said syphonator tube in said passage in said first end plate.

5. The combination of claim 4, said hollow cylinder being constructed of transparent material and having graduation marks thereon and indicia adjacent said graduation marks indicating the quantity of liquid contained in said metering chamber when the surface of liquid in the metering chamber is adjacent a graduation mark, said float valve being positionable adjacent said graduation marks to establish the quantity of liquid to be drawn into the metering chamber before the float valve closes the vacuum line.

6. The combination of claim 1 with the addition of an internal combustion engine; means drivingly connecting said engine to the pump, the pump having a suction side and a discharge side; a supply line connected between the suction side of the pump and the tank; a spray nozzle; a spray line connected between the discharge side of the pump and the spray nozzle; a fuel intake manifold on said engine; means securing said vacuum line to said intake manifold; a liquid check valve in said vacuum line, said liquid check valve being adapted to prevent flow of liquid through said vacuum line to said intake manifold; and a valve in said vacuum line, said valve having a first position connecting said intake manifold in fluid communication with said metering chamber and a second position venting said metering chamber to atmosphere.

7. The combination of claim 1 wherein the metering chamber comprises a second container having a neck; a cap; means to disengageably secure said cap to said neck; means securing said liquid transfer line through said cap; and means securing said vacuum line through said cap, said liquid transfer line and said vacuum line being simultaneously secured to said second container when the cap is secured to the neck on the container.

8. Apparatus to transfer a measured quantity of pesticide from a container into a tank having a pump and spray nozzle associated therewith for spraying liquid pesticide comprising: a metering chamber; means supporting the metering chamber at an elevation above the elevation of the container and above the elevation of the tank, said metering chamber having a vent passage adjacent an upper end thereof; a liquid transfer line; means connecting the liquid transfer line to the container such that a first end of the transfer line extends below the surface of pesticide in the container; means connecting a second end of the liquid transfer line in communication with the inside of the metering chamber; a vacuum line in communication with the inside of the metering chamber; an adjustable valve associated with said vent passage, said adjustable valve being arranged to close said vent passage when less than a predetermined volume of liquid is contained in said metering chamber and to open said vent passage when a predetermined volume of liquid is contained in said metering chamber; means to remove fluid from said vacuum line to reduce pressure in the metering chamber such that pressure in the metering chamber is sufficiently less than pressure in the container to draw liquid from said container through said liquid transfer line into said metering chamber; and valve means between said metering chamber and said tank, said valve means being movable between a first position wherein fluid communication between said metering chamber and said tank is blocked and a second position wherein said metering chamber is in fluid communication with said tank.

9. The combination of claim 8 wherein the means to remove fluid from the vacuum line comprises: an internal combustion engine; a fuel intake manifold on said engine; and means securing said vacuum line to said intake manifold.

* * * * *